(12) United States Patent
Sung et al.

(10) Patent No.: US 10,827,402 B1
(45) Date of Patent: Nov. 3, 2020

(54) HANDOVER CONTROL FOR A MULTI-USER MULTIPLE INPUT MULTIPLE OUTPUT (MU-MIMO) ACCESS POINT

(71) Applicant: Sprint Communications Company L.P., Overland Park, KS (US)

(72) Inventors: Sanghoon Sung, Ashburn, VA (US); Yun Sung Kim, Ashburn, VA (US); Hau V. Tran, Centreville, VA (US); Min Ho Song, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 46 days.

(21) Appl. No.: 16/378,389

(22) Filed: Apr. 8, 2019

(51) Int. Cl.
*H04W 36/00* (2009.01)

(52) U.S. Cl.
CPC ... *H04W 36/0079* (2018.08); *H04W 36/0016* (2013.01); *H04W 36/0061* (2013.01); *H04W 36/0077* (2013.01)

(58) Field of Classification Search
CPC ......... H04W 36/0079; H04W 36/0016; H04W 36/0061; H04W 36/0077
See application file for complete search history.

(56) References Cited

U.S. PATENT DOCUMENTS

| | | | |
|---|---|---|---|
| 8,948,281 B2 | 2/2015 | Kim et al. | |
| 9,300,378 B2 | 3/2016 | Harel et al. | |
| 9,332,455 B2 | 5/2016 | Tellado et al. | |
| 9,332,475 B2 | 5/2016 | Attar et al. | |
| 9,736,746 B2 | 8/2017 | Tiwari et al. | |
| 9,788,254 B2 | 10/2017 | Park et al. | |
| 9,854,463 B2 | 12/2017 | Park et al. | |
| 2013/0064129 A1* | 3/2013 | Koivisto | H04B 7/0621 370/252 |
| 2016/0135069 A1 | 5/2016 | Park et al. | |
| 2017/0047977 A1* | 2/2017 | Kim | H04B 7/0621 |
| 2018/0007583 A1 | 1/2018 | Hong et al. | |
| 2018/0220340 A1* | 8/2018 | Ramachandra | H04W 36/0027 |
| 2018/0254797 A1 | 9/2018 | Amini et al. | |
| 2020/0154333 A1* | 5/2020 | Paladugu | H04B 7/022 |

* cited by examiner

*Primary Examiner* — Duc C Ho

(57) ABSTRACT

In a Multi-User Multiple Input Multiple Output (MU-MIMO) radio, networking circuitry transfers MU-MIMO target information to a neighbor radio. The neighbor radio processes the MU-MIMO target information to propose User Equipment (UEs) for handover from the neighbor radio to the MU-MIMO radio. In the MU-MIMO radio, transceiver circuitry determines MU-MIMO channel characteristics for the UEs. Based on their MU-MIMO channel characteristics, the networking circuitry selects some of the UEs from the handover proposals and rejects the other UEs. The transceiver circuitry wirelessly transfers handover acceptance signals to the selected UEs. The transceiver circuitry wirelessly transfers handover rejection signals to the rejected UEs. The transceiver circuitry wirelessly transfers user data to the selected UEs using MU-MIMO.

20 Claims, 6 Drawing Sheets

HANDOVER CONTROL FOR A MULTI-USER MULTIPLE INPUT MULTIPLE OUTPUT (MU-MIMO) ACCESS POINT

TECHNICAL BACKGROUND

Wireless user devices exchange wireless signals with wireless communication networks for data services like voice-calling, internet-access, and media streaming. The wireless communication networks have wireless access points that exchange the wireless signals with the wireless user devices. A wireless access point has several antennas, modulators, and processors. The wireless user devices also have antennas, modulators, and processors. The processors execute network applications to control the transmission and reception of the wireless signals. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP).

The wireless access points handover the wireless user devices amongst one another as the user devices move about. A mobile user device typically loses signal strength from its source access point and gains signal strength from a target access point. The source and target wireless access points exchange signaling with one another and with the wireless user device to attach the user device to the target access point and to detach the user device from the source access point.

Multiple Input Multiple Output (MIMO) is a signal processing technology used by wireless access points. MIMO technology directs user signals to multiple antennas that each have independent power and phase control. MIMO technology may direct the same user signal to multiple antennas for reliable transport. MIMO technology may direct different user signals to multiple antennas for a high-bandwidth service.

Multi-User MIMO (MU-MIMO) technology shares time and frequency resources among the wireless user devices to improve the spectral efficiency of the wireless access point. With MU-MIMO, multiple wireless user devices receive wireless signals from the same access point at the same time and at the same frequency. Since the same time and frequency resources are used, the MU-MIMO technology independently beamforms the wireless signals for each of the wireless user devices. The independent beamforming enables the wireless user devices to derive their own user data from the shared wireless signal.

Unfortunately, wireless access points do not effectively control device handovers to optimize MU-MIMO spectral efficiency.

Technical Overview

In a Multi-User Multiple Input Multiple Output (MU-MIMO) radio, networking circuitry transfers MU-MIMO target information to a neighbor radio. The neighbor radio processes the MU-MIMO target information to propose User Equipment (UEs) to handover from the neighbor radio to the MU-MIMO radio. In the MU-MIMO radio, transceiver circuitry determines MU-MIMO channel characteristics for the UEs. Based on their MU-MIMO channel characteristics, the networking circuitry selects some of the UEs from the handover proposals and rejects the other UEs. The transceiver circuitry wirelessly transfers handover acceptance signals to the selected UEs. The transceiver circuitry wirelessly transfers handover rejection signals to the rejected UEs. The transceiver circuitry wirelessly transfers user data to the selected UEs using MU-MIMO.

DETAILED DESCRIPTION

Figure 1:
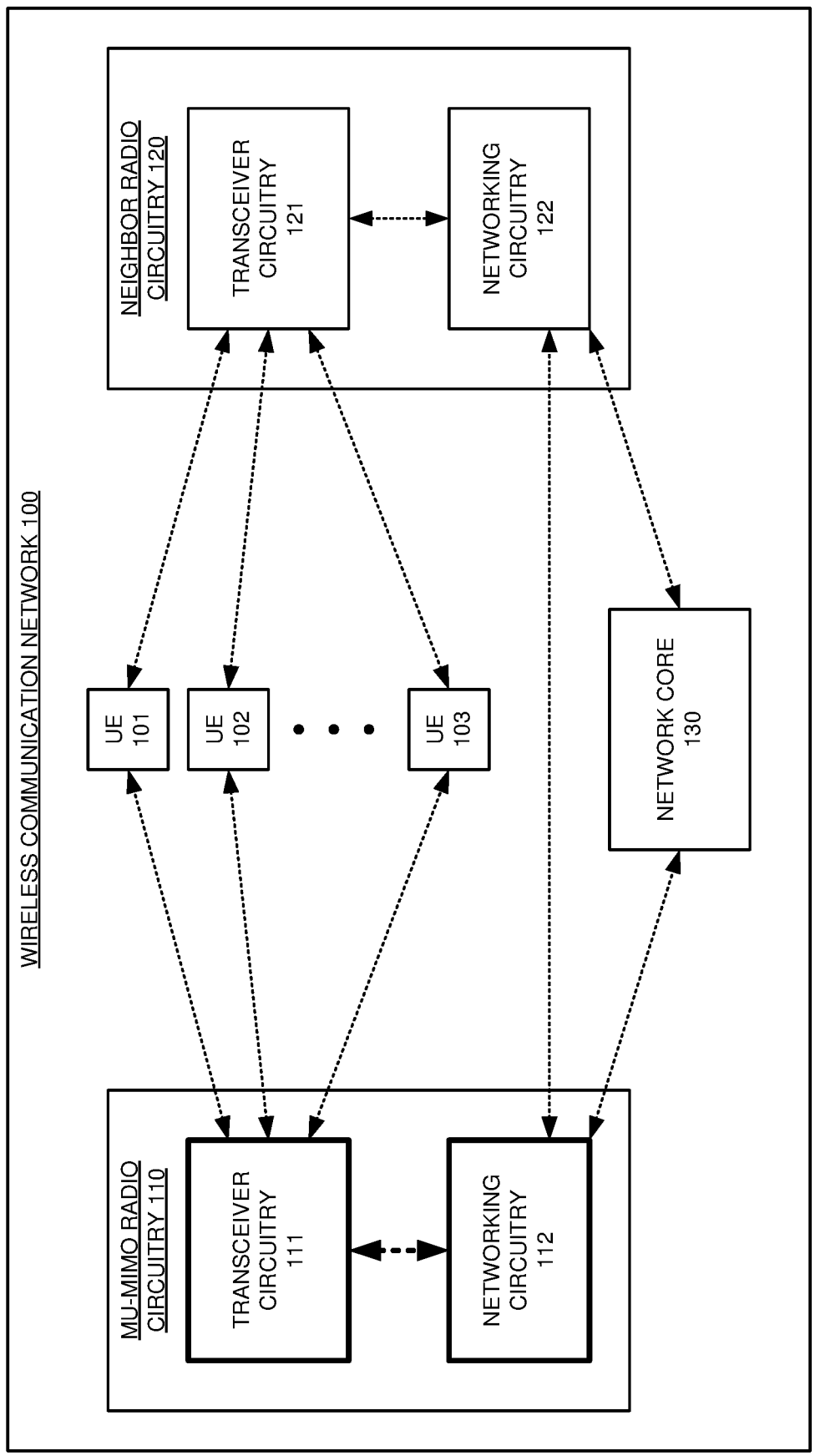
FIG. 1 illustrates a wireless communication network that comprises Multi-User Multiple Input Multiple Output (MU-MIMO) radio circuitry to control User Equipment (UE) handovers from neighbor radio circuitry to optimize MU-MIMO spectral efficiency.

FIG. 1 illustrates wireless communication network 100 that comprises Multi-User Multiple Input Multiple Output (MU-MIMO) radio circuitry 110 to control User Equipment (UE) handovers from neighbor radio circuitry 120 to optimize MU-MIMO spectral efficiency. Wireless communication network 100 comprises UEs 101-103, MU-MIMO radio circuitry 110, neighbor radio circuitry 120, and network core 130. MU-MIMO radio circuitry 110 comprises transceiver circuitry 111 and networking circuitry 112. Neighbor radio circuitry 120 comprises transceiver circuitry 121 and networking circuitry 122. The number of UEs that are depicted on FIG. 1 has been restricted for clarity, and wireless communication network 100 includes many more UEs that are like UEs 101-103.

UEs 101-103 and transceiver circuitry 111 communicate over wireless data links. UEs 101-103 and transceiver circuitry 121 communicate over wireless data links. Transceiver circuitry 111 and networking circuitry 112 communicate over data links. Transceiver circuitry 121 and networking circuitry 122 communicate over data links. Networking circuitry 112 and networking circuitry 122 communicate over data links. Network core 130 and networking circuitry 112 communicate over data links. Network core 130 and networking circuitry 122 communicate over data links. Exemplary wireless data links comprise Fifth Generation New Radio (5GNR), Long Term Evolution (LTE), and Institute of Electrical and Electronic Engineers (IEEE) 802.11 (WIFI). Exemplary wireline data links comprise IEEE 802.3 (Ethernet), Internet Protocol (IP), Intra-Processor Communications (IPC), bus data protocols, Time Division Multiplex (TDM), Data Over Cable System Interface Specification (DOCSIS), Wave Division Multiplexing (WDM), and/or the like UEs 101-103 might be phones, computers, robots, vehicles, sensors, and/or the like. UEs 101-103 comprise radio circuitry and control circuitry. The radio circuitry comprises antennas, modulators, amplifiers, filters, digital/ analog interfaces, processing circuitry, memory circuitry, and bus circuitry. The control circuitry comprises processing circuitry, memory circuitry, and bus circuitry. Software is stored in the memory circuitry and includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, network applications, and user applications to exchange wireless signals with transceiver circuitry 111 and transceiver circuitry 121. In particular, the processing circuitry executes the operating systems and network applications like the PHY to transfer measurement reports and/or SRS and to receive MU-MIMO signals.

MU-MIMO radio circuitry 110 comprises transceiver circuitry 111 and networking circuitry 112. Transceiver circuitry 111 comprises antennas, modulators, amplifiers, filters, digital/analog interfaces, processing circuitry, and memory. Networking circuitry 112 comprises processing circuitry and memory. The processing circuitry comprises Digital Signal Processors (DSPs), Central Processing Units (CPUs), Graphical Processing Units (GPUs), Field Programmable Gate Arrays (FPGAs), Application Specific Integrated Circuits (ASICs) and/or the like. The memory comprises Random Access Memory (RAM), flash memory, disk drives, and/or the like. The memory stores software like operating systems and network applications. The network applications comprise PHY, MAC, RLC, PDCP, RRC, and SDAP or some other network protocol stack. The processing circuitry executes the operating systems and network applications to exchange wireless signals with UEs 101-103, exchange corresponding user data and signaling between transceiver circuitry 111 and networking circuitry 112, and exchange corresponding user data and signaling between networking circuitry 112 and network core 130 and/or neighbor radio circuitry 120. In particular, the processing circuitry executes the operating systems and network applications like the RRC, MAC, and PHY to select UEs 101-103 for handover into MU-MIMO groups and to transmit MU-MIMO signals to UEs 101-103.

Neighbor radio circuitry 120 comprises transceiver circuitry 121 and networking circuitry 122. Transceiver circuitry 121 comprises antennas, modulators, amplifiers, filters, digital/analog interfaces, processing circuitry, and memory. Networking circuitry 122 comprises processing circuitry and memory. The processing circuitry comprises DSPs, CPUs, GPUs, FPGAs, ASICs, and/or the like. The memory comprises RAM, flash memory, disk drives, and/or the like. The memory stores software like operating systems and network applications. The network applications comprise PHY, MAC, RLC, PDCP, RRC, and SDAP or some other network protocol stack. The processing circuitry executes the operating systems and network applications to exchange wireless signals with UEs 101-103, exchange corresponding user data and signaling between transceiver circuitry 111 and networking circuitry 112, and exchange corresponding user data and signaling between networking circuitry 112 and network core 130 and/or MU-MIMO radio circuitry 110. In some examples, the processing circuitry executes the operating systems and network applications like the PHY, MAC, and RRC to transmit MU-MIMO signals to UEs 101-103.

Network core 120 comprises processing circuitry and memory. The processing circuitry comprises CPUs, GPUs, FPGAs, ASICs, and/or the like. The memory includes RAM, flash memory, disk drives, network transceivers, and/or the like. The memory stores software like operating systems, virtual layers, and network functions. The network functions comprise Access and Mobility Management Function (AMF), User Plane Function (UPF), Session Management Function (SMF), Policy Control Function (PCF), Authentication Server Function (AUSF), Network Slice Selection Function (NSSF), and the like. The processing circuitry executes the operating systems, virtual layers, and network functions to exchange the user data and signaling with MU-MIMO radio circuitry 110 and with neighbor radio circuitry 120.

To control UE handovers, networking circuitry 111 in MU-MIMO radio circuitry 110 transfers MU-MIMO target information to networking circuitry 122 in neighbor radio circuitry 112. The MU-MIMO target information indicates MU-MIMO pairing sizes and their corresponding channel characteristics like signal strength and/or quality. For example, the MU-MIMO target information may indicate a decibel range for MU-MIMO pairings of four UEs and another decibel range for MU-MIMO pairings of eight UEs.

In neighbor radio circuitry 120, transceiver circuitry 121 receives measurement reports from UEs 101-103. The measurement reports indicate channel characteristics like signal strength, signal quality, and the like. Transceiver circuitry 121 transfers the channel characteristics to networking circuitry 122. Networking circuitry 122 processes the MU-MIMO target information and the channel characteristics to allocate UEs 101-103 into MU-MIMO groups for handover to MU-MIMO radio circuitry 110. For example, networking circuitry 122 may process the received signal strength at UEs 101-103 for wireless signals from MU-MIMO radio circuitry 110 to allocate individual UEs 101-103 into various MU-MIMO groups. Networking circuitry 122 proposes UE handovers to networking circuitry 112 for individual UEs 101-103 that were allocated to the MU-MIMO pairing groups. Typically, networking circuitry 122 proposes UE handovers for the largest MU-MIMO pairing group first and then proceeds to the smaller MU-MIMO pairing groups.

In MU-MIMO radio circuitry 110, transceiver circuitry 111 receives measurement reports and/or Sounding Reference Signals (SRS) from UEs 101-103. The measurement reports may be received in attachment signaling from UEs 101-103. The measurement reports indicate channel characteristics like received signal strength and quality for neighbor radio circuitry 120 and MU-MIMO radio circuitry 110. The SRS indicate channel characteristics like Angle-of-Arrival (AoA) and path loss. The AoA is used to determine cross-correlation factors between UEs. The cross-correlation factors indicate MU-MIMO beam overlap between potentially paired UEs, and UEs with high cross-correlation are not paired together. Transceiver circuitry 111 transfers the channel characteristics to networking circuitry 112. The handover proposals from neighbor radio circuitry 120 may have similar channel data.

Networking circuitry 112 processes the handover proposals from neighbor radio circuitry 120 along with the channel characteristic data from transceiver circuitry 111 to select individual UEs 101-103 for handover from neighbor radio circuitry 120 to MU-MIMO radio circuitry 110. Typically, networking circuitry 112 processes the UE handover proposals for the largest MU-MIMO pairing group first and then proceeds to the smaller MU-MIMO pairing groups. In MU-MIMO radio circuitry 110, networking circuitry 112 selects individual UEs 101-103 from the proposals for MU-MIMO pairing. For example, networking circuitry 112 may process the AoA and the received signal strength for UE 101 to allocate UE 101 to a MU-MIMO group of 16 UEs. Networking circuitry 112 may process the cross-correlation factors for UE 102 and other UEs to reject UE 102 from joining any MU-MIMO groups and consequently to reject UE 102 from handing over.

Networking circuitry 112 directs transceiver circuitry 111 to attach the selected UEs and to reject the rejected UEs. Networking circuitry 112 directs networking circuitry 121 to keep the rejected UEs. Transceiver circuitry 111 transfers handover acceptance signals to the selected UEs and transfers handover rejection signals to the rejected UEs. The selected UEs perform the handover from transceiver circuitry 121 to transceiver circuitry 111. Transceiver circuitry 111 then transfers user data to the selected UEs using the MU-MIMO pairings.

Subsequently, networking circuitry 112 may determine channel characteristics and/or MU-MIMO pairing rates for its served UEs (including selected and handed-over UEs 101-103). Networking circuitry 112 selects some of these UEs for handover from MU-MIMO radio circuitry 110 to neighbor radio circuitry 120 based on their channel characteristics and/or MU-MIMO pairing rates. For example, networking circuitry 112 may select UE 103 for handover to neighbor radio circuitry 120 based on a MU-MIMO pairing rate below five percent. Networking circuitry 112 transfers hand-over signaling to networking circuitry 122 to handover the selected UEs from MU-MIMO radio circuitry 110 to neighbor radio circuitry 120.

Advantageously, MU-MIMO radio circuitry 110 effectively controls the handovers of UEs 101-103 to optimize MU-MIMO spectral efficiency.

Figure 2:
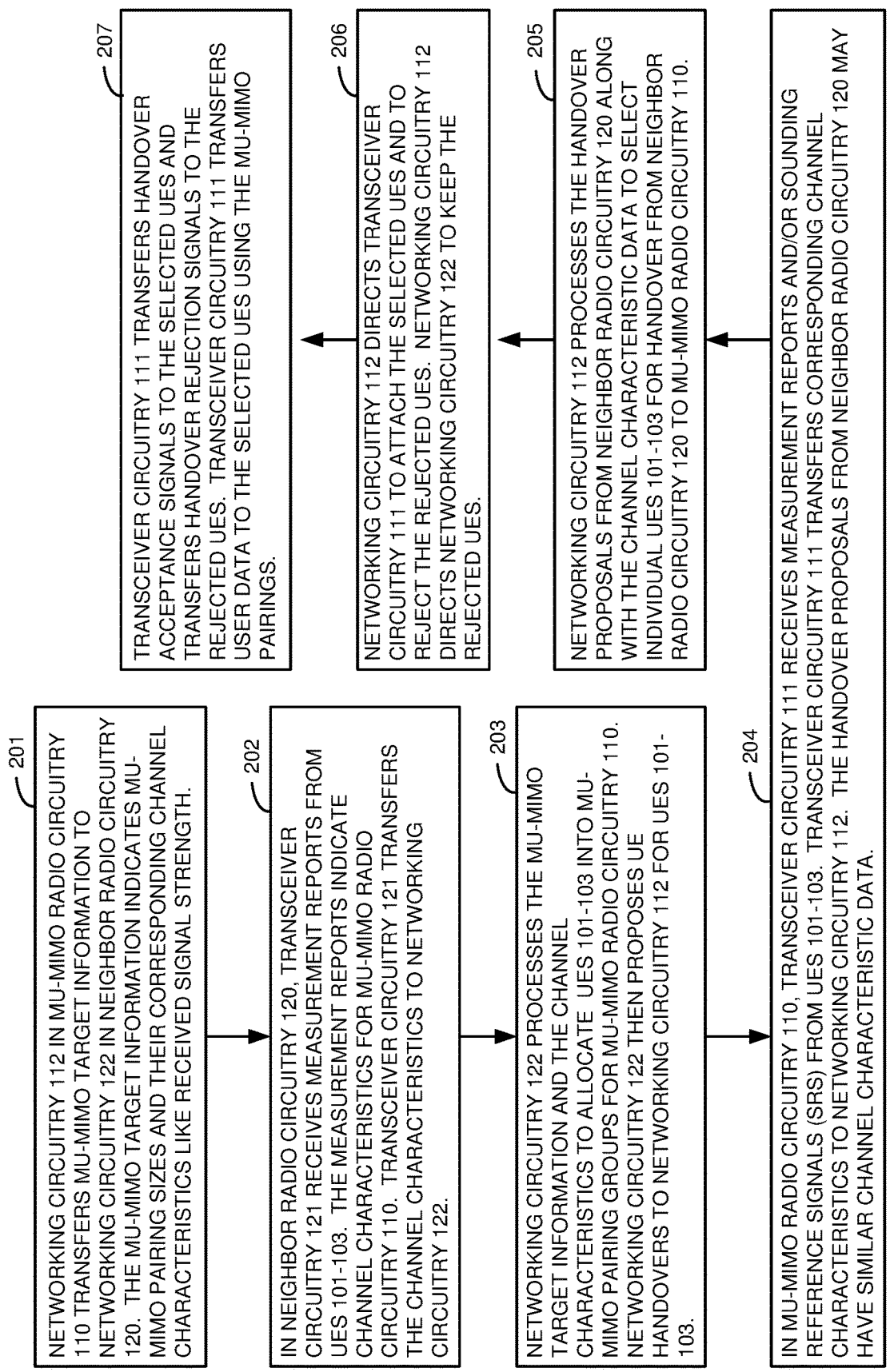
FIG. 2 illustrates the operation of the wireless communication network that comprises the MU-MIMO radio circuitry to control UE handovers from neighbor radio circuitry to optimize MU-MIMO spectral efficiency.

FIG. 2 illustrates the operation of wireless communication network 100 that comprises MU-MIMO radio circuitry 110 to control UE handovers from neighbor radio circuitry 120 to optimize MU-MIMO spectral efficiency. Networking circuitry 112 in MU-MIMO radio circuitry 110 transfers MU-MIMO target information to networking circuitry 122 in neighbor radio circuitry 120 (201). The MU-MIMO target information indicates MU-MIMO pairing sizes and their corresponding channel characteristics like received signal strength ranges. For example, the MU-MIMO target information may indicate a decibel range for MU-MIMO pairings of 16 UEs.

In neighbor radio circuitry 120, transceiver circuitry 121 receives measurement reports from UEs 101-103 (202). The measurement reports indicate channel characteristics like received signal strength and quality—including channel characteristics for MU-MIMO radio circuitry 110. Transceiver circuitry 121 transfers the channel characteristics to networking circuitry 122. Networking circuitry 122 processes the MU-MIMO target information and the channel characteristics to allocate UEs 101-103 into MU-MIMO pairing groups for handover to MU-MIMO radio circuitry 110 (203). For example, networking circuitry 122 may process received signal strength from MU-MIMO radio circuitry 110 at UEs 101-103 to allocate UEs 101-103 into MU-MIMO pairing groups based on the decibel ranges in MU-MIMO target information. Networking circuitry 122 then proposes UE handovers to networking circuitry 112 for individual UEs 101-103 that are allocated to the MU-MIMO pairing groups. Typically, networking circuitry 122 proposes UE handovers for the largest MU-MIMO pairing group first and then proceeds to smaller MU-MIMO pairing groups.

In MU-MIMO radio circuitry 110, transceiver circuitry 111 receives measurement reports and/or Sounding Reference Signals (SRS) from UEs 101-103 (204). The measurement reports are received in attachment signaling from UEs 101-103. The measurement reports indicate channel characteristics like received signal strength for neighbor radio circuitry 120 and for MU-MIMO radio circuitry 110. The SRS indicates channel characteristics like AoA and path loss. The AoA is used to determine cross-correlation factors that predict beam interference between UEs. Transceiver circuitry 111 transfers the channel characteristics to networking circuitry 112. The handover proposals from neighbor radio circuitry 120 may have similar channel characteristic data.

Networking circuitry 112 processes the handover proposals from neighbor radio circuitry 120 along with the channel characteristics to select individual UEs 101-103 for handover from neighbor radio circuitry 120 to MU-MIMO radio circuitry 110 (205). For example, neighbor radio circuitry 120 may propose the handover of UE 101 to join a MU-MIMO group of 16 UEs based on its reported signal strength for MU-MIMO radio circuitry 110, and networking circuitry 112 may process the proposal along with the AoA and path loss for UE 101 to select UE 101 for handover. In another example, neighbor radio circuitry 120 may propose the handover of UE 103 to a MU-MIMO group of 4 UEs, and networking circuitry 112 may process the proposal along with cross-correlation factors for UE 103 to reject UE 103 from joining any four-UE MU-MIMO group. Networking circuitry 112 may still accept the handover of UE 103 for a different MU-MIMO group or reject the handover of UE 103 altogether. Typically, networking circuitry 112 processes the UE handover proposals for the largest MU-MIMO pairing group first and then proceeds to the smaller MU-MIMO pairing groups.

Networking circuitry 112 directs transceiver circuitry 111 to attach the selected UEs and to reject the rejected UEs (206). Networking circuitry 112 directs networking circuitry 122 to keep the rejected UEs. Transceiver circuitry 111 transfers handover acceptance signals to the selected UEs which then perform handovers to MU-MIMO radio circuitry 110 (207). Transceiver circuitry 111 also transfers handover rejection signals to the rejected UEs. Transceiver circuitry 111 then transfers user data to the selected UEs using the MU-MIMO pairings.

Figure 3:
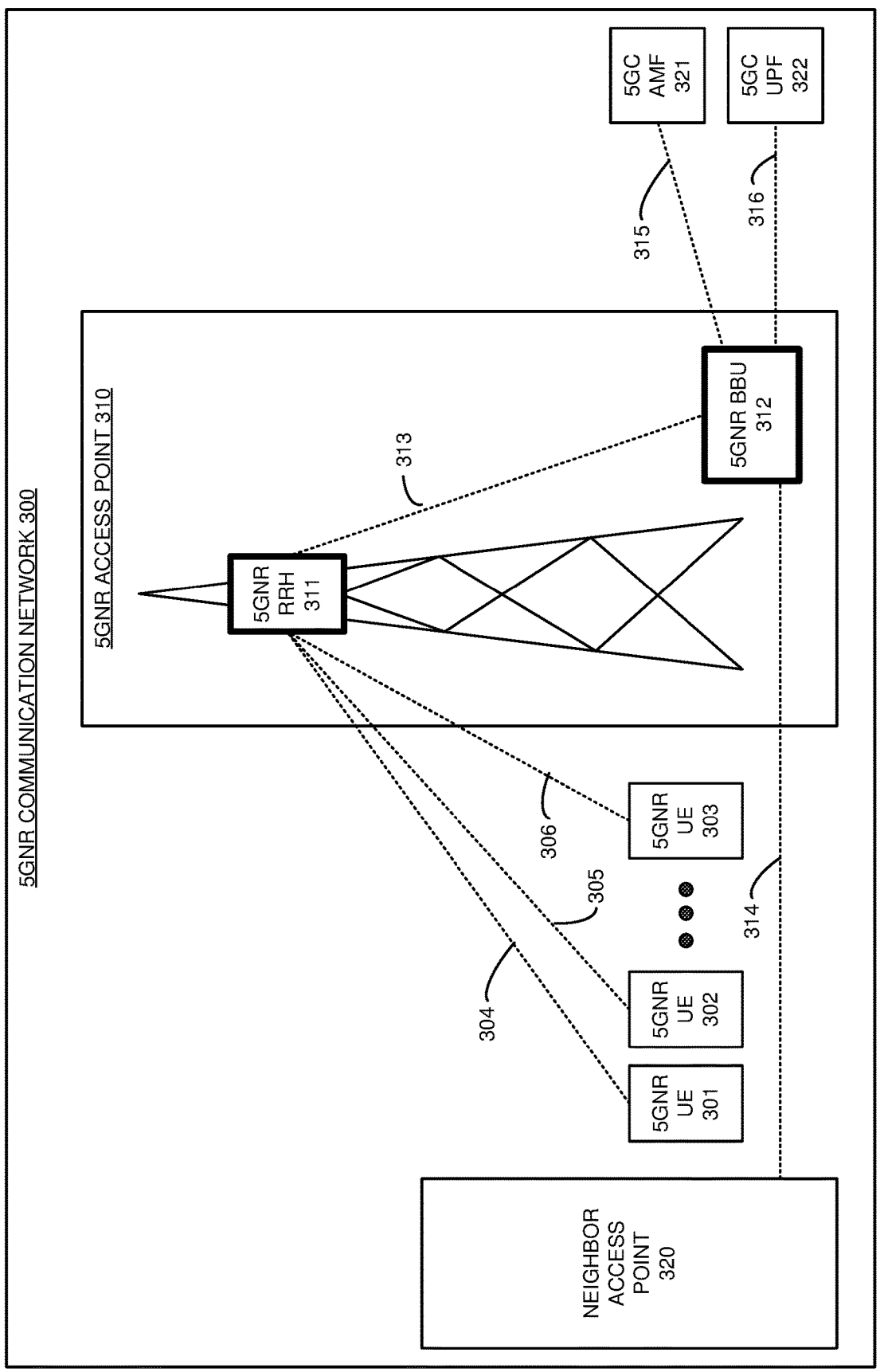
FIG. 3 illustrates Fifth Generation New Radio (5GNR) communication network that controls UE handovers from a neighbor access point to a 5GNR access point to optimize MU-MIMO spectral efficiency.

FIG. 3 illustrates Fifth Generation New Radio (5GNR) communication network 300 that controls UE handovers from neighbor access point 320 to 5GNR access point 310 to optimize MU-MIMO spectral efficiency. 5GNR communication network 300 is an example of wireless communication network 100, although network 100 may differ. 5GNR communication network 300 comprises 5GNR UEs 301-303, 5GNR access point 310, Fifth Generation Core (5GC) Access and Mobility Management Function (AMF) 321, and 5GC User Plane Function (UPF) 322. 5GNR access point 310 comprises 5GNR Remote Radio Head (RRH) 311 and 5GNR Baseband Unit (BBU) 312. 5GNR UEs 301-303 might be computers, sensors, phones, robots, vehicles, and the like. 5GNR UEs 301-303 and 5GNR RRH 311 are coupled over 5GNR links 304-306. 5GNR RRH 311 and 5GNR BBU 312 are coupled over 5GNR RLC/PDCP link 313. 5GNR BBU 312 and neighbor access point 320 are coupled over X2 link 314. 5GNR BBU 312 and 5GC AMF 321 are coupled over 5GNR N1/N2 link 315. 5GNR BBU 312 and 5GC UPF 322 are coupled over 5GNR N3 link 316. The number of UEs on FIG. 3 has been restricted for clarity, and 5GNR communication network 300 includes many more UEs like UEs 301-303.

To control UE handovers, 5GNR BBU 312 transfers MU-MIMO target information to neighbor access point 320.

The MU-MIMO target information indicates MU-MIMO pairing sizes (2, 4, 8, 16) and their respective channel quality ranges in decibels. The larger MU-MIMO pairing groups require better channel quality due to power constraints. Neighbor access point 320 receives measurement reports from UEs 301-303 that indicate channel characteristics like signal strength and signal quality. Neighbor access point 320 processes the MU-MIMO target information and the channel characteristics to assign UEs 301-303 to MU-MIMO pairing groups for handover to 5GNR access point 310. For example, neighbor access point 320 may process the received signal strength for 5GNR access point 310 at UE 301 to allocate UE 301 into a MU-MIMO pairing group based on its corresponding decibel range. Neighbor access point 320 proposes UE handovers to 5GNR access point 310 for individual UEs 301-303 that were allocated to the MU-MIMO pairing groups. Typically, neighbor access point 320 proposes UE handovers for the largest MU-MIMO pairing group first and then proceeds to the smaller MU-MIMO pairing groups.

5GNR RRH 311 receives measurement reports and/or Sounding Reference Signals (SRS) from UEs 301-303. The measurement reports are received in attachment signaling from UEs 301-303. The measurement reports indicate channel characteristics like received signal strength and quality for 5GNR access point 310. The SRS are processed to determine channel characteristics like Angle-of-Arrival (AoA) and path loss. The AoA is used to determine cross-correlation factors between UEs, and UEs with a high cross-correlation are not paired together. 5GNR RRH 311 transfers the channel characteristics to 5GNR BBU 312. The handover proposals from neighbor access point 320 may have similar channel characteristic data. 5GNR BBU 312 processes the handover proposals from neighbor access point 320 along with the channel characteristic data to select individual UEs 301-303 for handover from neighbor access point 320 to 5GNR access point 310. For example, 5GNR BBU 312 may process the AoA and path loss for UE 303 to select UE 303 for handover into a MU-MIMO group of 16 UEs. 5GNR BBU 312 may process cross-correlation factors for UE 301 to reject UE 301 from handing over. Typically, 5GNR BBU 312 processes the UE handover proposals for the largest MU-MIMO pairing group first and then proceeds to the smaller MU-MIMO pairing groups.

5GNR BBU 312 transfers handover acceptance signals to the selected UEs 301-303 over 5GNR RRH 311. 5GNR BBU 312 transfers handover rejection signals to the rejected UEs over 5GNR RRH 311. 5GNR BBU 312 directs neighbor access point 320 to keep the rejected UEs. The selected UEs 301-303 perform handovers from neighbor access point 320 to 5GNR access point 310. 5GNR RRH 311 transfers user data to selected UEs 301-303 using the MU-MIMO pairings.

Subsequently, 5GNR BBU 312 determines channel characteristics and/or MU-MIMO pairing rates for its served UEs (including selected and handed-over UEs 301-303). 5GNR BBU 312 selects some UEs for handover from 5GNR access point 310 to neighbor access point 320 based on the channel characteristics and/or MU-MIMO pairing rates. For example, 5GNR BBU 312 may select UE 303 for handover back to neighbor access point 320 based on poor SRS signal quality. 5GNR BBU 312 transfers hand-over signaling to neighbor access point 320 to hand-over the selected UEs.

Figure 4:
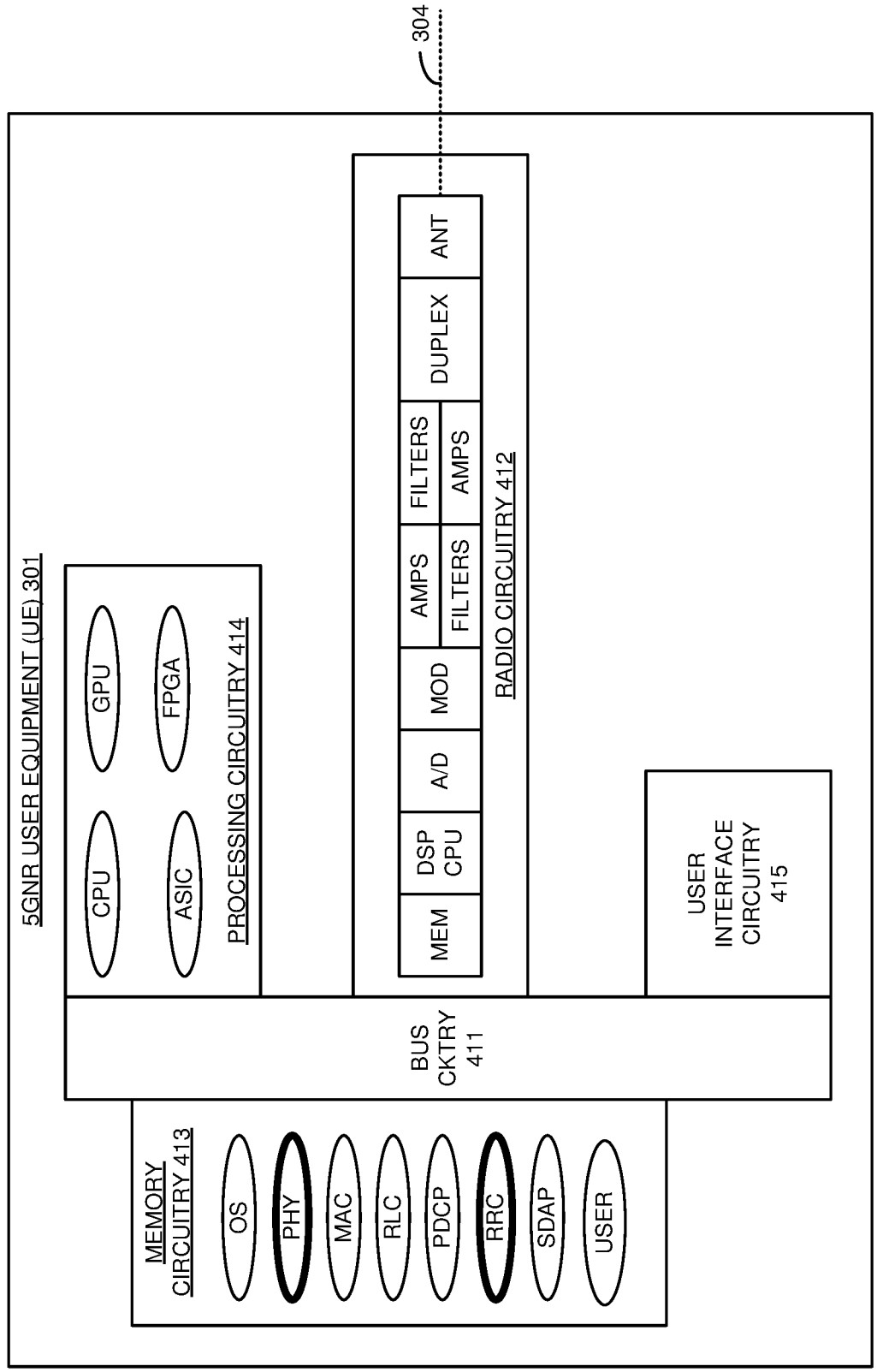
FIG. 4 illustrates a 5GNR UE that hands-over from a neighbor access point to a 5GNR access point to optimize MU-MIMO spectral efficiency.

FIG. 4 illustrates 5GNR UE 301 that hands-over from neighbor access point 320 to 5GNR access point 310 to optimize MU-MIMO spectral efficiency. 5GNR UE 301 is an example of UEs 101-103 and 302-303, although UEs 101-103 and 302-303 may differ. 5GNR UE 301 comprises bus circuitry 411, radio circuitry 412, memory circuitry 413, processing circuitry 414, and user interface circuitry 415. User interface circuitry 415 may comprise transceivers, machine controllers, graphic displays, sensors, cameras, and/or some other user components. Bus circuitry 411 couples radio circuitry 412, memory circuitry 413, processing circuitry 414, and user interface circuitry 415.

Memory circuitry 413 comprises volatile and non-volatile memories like RAM, flash, disc, tape, and the like. Memory circuitry 413 stores an operating system (OS), network applications, and user applications (User). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, FPGAs, and/or some other computer hardware. Processing circuitry 414 executes the operating system and user applications to generate user data and signaling. Processing circuitry 414 executes the operating system and the network applications to drive radio circuitry 412 to wirelessly exchange the user data and network signaling with 5GNR access point 310 over 5GNR link 304.

Radio circuitry 412 comprises antennas (ANT), duplexers (DUPLEX), filters, amplifiers (AMPS), modulators (MOD), Analog/Digital interfaces (A/D), DSP, CPU, and memory (MEM). The antennas in radio circuitry 412 exchange wireless signals with 5GNR access point 310 that carry user data and network signaling. In radio circuitry 412, the DSP/CPUs execute firmware/software to drive the exchange of corresponding data and signaling between the antennas and memory circuitry 413.

Through the operating system, the user applications exchange user data with the SDAP and exchange user signaling with the RRC. The SDAP maps between user data and Service Data Units (SDUs). The RRC performs attachment and interacts with AMFs over N1 signaling to establish and terminate data sessions. The RRC handles authentication, security, handovers, status reporting, Quality-of-Service (QoS), system broadcasts, and network pages. The RRC and the SDAP exchange the SDUs with the PDCP. The PDCP maps between the SDUs and Protocol Data Units (PDUs) for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise ARQ, sequence numbering and resequencing, segmentation and resegmentation. The RLC exchanges the data and signaling from the PDUs with the MAC over MAC logical channels. The MAC maps between the MAC logical channels and MAC transport channels. MAC functions include buffer status, power headroom, channel quality, Hybrid Automatic Repeat Request (HARM), user identification, random access, user scheduling, and QoS. The MAC exchanges the data and signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. The PHY exchanges the user data and network signaling with PHYs in access points 310 and 320 over PHY transport channels.

The PHY stores Uplink (UL) data and signaling in the radio circuitry 412 memory. In radio circuitry 412, the DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals that carry the UL data and signaling to access points 310 and 320.

In radio circuitry 412, the antennas receive wireless Downlink (DL) signals that carry data and signaling from access points 310 and 320. The DL signals may be MU-MIMO signals. The antennas transfer corresponding electrical DL signals through the duplexers to the amplifiers. In radio circuitry 412, the amplifiers boost the received DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data that includes user data and network signaling from the DL signals. The DSP/CPUs transfer the DL data and signaling to memory circuitry 413. The network applications process the DL data and signaling and forward corresponding user data and signaling to the user applications. The user applications process the user data and signaling to drive user interface circuitry 415.

In particular, the PHY determines channel characteristics like received signal strength and quality for access points 310 and 320. The RRC transmits the channel characteristics to access points 310 and 320. The PHY transmits Sounding Reference Signals (SRS) to access points 310 and 320. The RRC exchanges network signaling to perform UE handovers. The MAC receives scheduling information that indicates shared MU-MIMO resource blocks. The PHY isolates the downlink MU-MIMO signals for UE 301 from the other MU-MIMO signals in shared MU-MIMO resource blocks.

Figure 5:
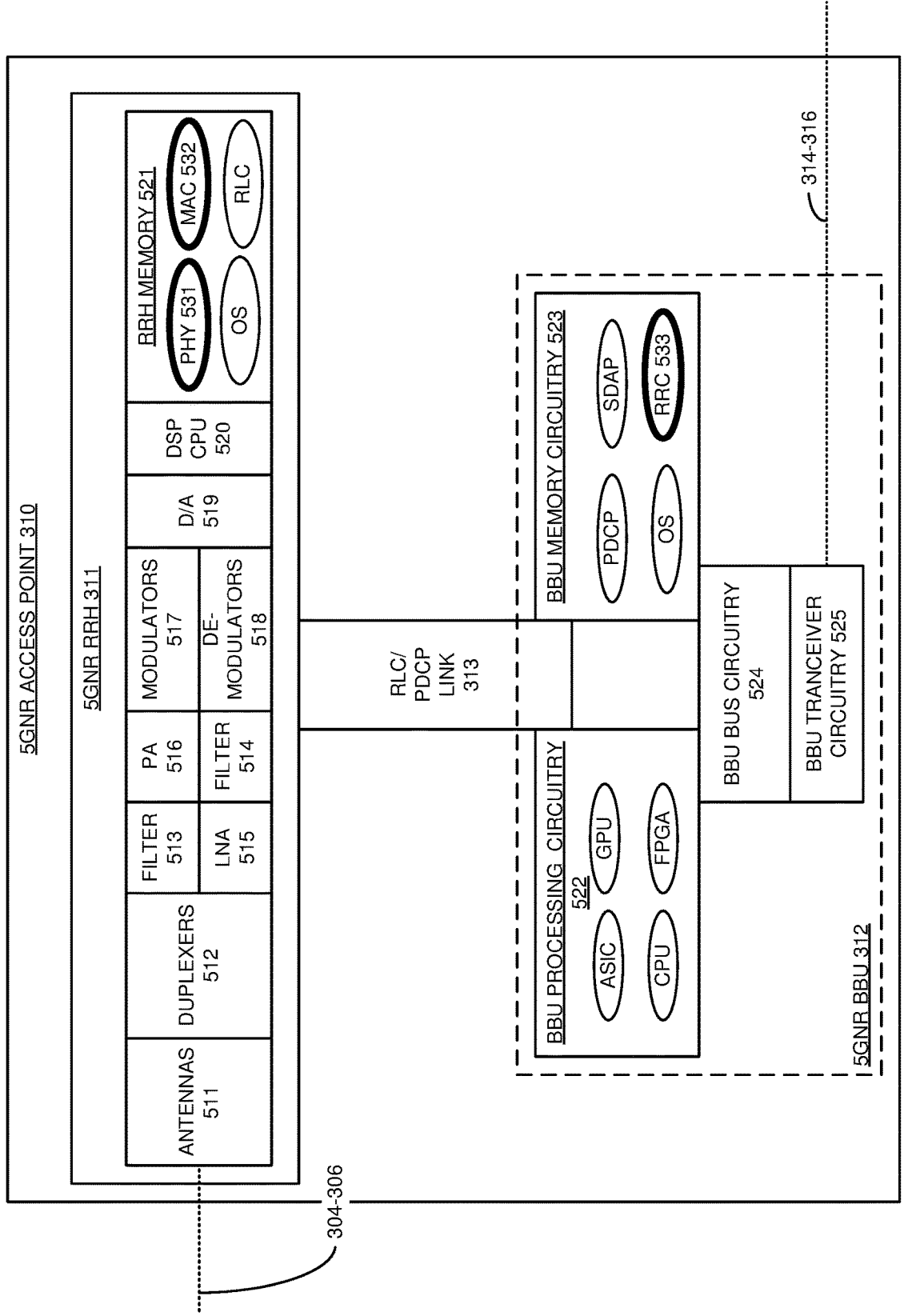
FIG. 5 illustrates the 5GNR access point that controls UE handovers from a neighbor access point to optimize MU-MIMO spectral efficiency.

FIG. 5 illustrates 5GNR access point 310 that controls UE handovers from neighbor access point 320 to optimize MU-MIMO spectral efficiency. 5GNR access point 310 is an example of MU-MIMO radio circuitry 110, although circuitry 110 may differ. 5GNR access point 310 comprises 5GNR Remote Radio Head (RRH) 311, 5GNR BBU 312, and RLC/PDCP link 313. 5GNR BBU 312 comprises BBU processing circuitry 522, BBU memory circuitry 523, BBU bus circuitry 524, and BBU transceiver circuitry 525. RLC/PDCP link 313 couples the RLC in 5GNR RRH 311 to the PDCP in 5GNR BBU 312. BBU bus circuitry 524 couples BBU processing circuitry 522, BBU memory circuitry 523, and BBU transceiver circuitry 525. BBU transceiver circuitry 525 is coupled to neighbor access point 320 over X2 link 314. BBU transceiver circuitry 525 is coupled to 5GC AMF 321 over N1/N2 link 315. BBU transceiver circuitry 525 is coupled to 5GC UPF 322 over N3 link 316.

BBU processing circuitry 522 comprises CPUs, GPUs, ASICs, FPGAs, and/or some other computer circuitry. BBU memory circuitry 523 comprises volatile and non-volatile memories like RAM, flash, disc, tape, and the like. BBU memory circuitry 523 stores an operating system and network applications. In this example, the network applications comprise PDCP, RRC 533, and SDAP—although BBU circuitry 522 may host all network applications, no network applications, or another group of network applications. BBU processing circuitry 522 executes the operating system and network applications to exchange data and signaling in PDUs with 5GNR RRH 311. BBU processing circuitry 522 executes the operating system and network applications to exchange corresponding N1 signaling and N2 signaling with AMF 321 and to exchange N3 data with UPF 325 over BBU circuitry 524-525.

5GNR RRH 311 comprises antennas 511, duplexers 512, filters 513-514, Low-Noise Amplifier (LNA) 515, Power Amplifier (PA) 516, modulators 517, de-modulators 518, D/A interfaces 519, DSP/CPU 520, and RRH memory 521. RRH memory 521 comprises volatile and non-volatile memories like RAM, flash, and the like. RRH memory 521 stores an operating system and network applications. In this example, the RRH network applications comprise PHY 531, MAC 532, and RLC—although 5GNR RRH 311 may host all network applications, no network applications, or another group of network applications. In this exemplary split, the RLC in RRH 311 and the PDCP in BBU 312 exchange PDUs that carry data and signaling over RLC/PDCP link 313. DSP/CPU 520 executes the operating systems and network applications to exchange the data and signaling between BBU memory circuitry 523 and UEs 301-303 over 5GNR RRH 311.

In BBU processing circuitry 522, RRC 533 generates and consumes N2 signaling that it exchanges with AMF 321. RRC 533 exchanges N1 signaling between UEs 301-303 and AMF 321. RRC 533 also handles data sessions, security, handovers, status reports, QoS, system broadcasts, and network pages. The SDAP exchanges N3 data with UPF 322. The SDAP maps the N3 data into SDUs and marks the data for the proper QoS. RRC 533 and the SDAP exchange their SDUs with the PDCP.

The PDCP maps between the SDUs and PDUs for the RLC. PDCP functions comprise security ciphering, header compression and decompression, sequence numbering and re-sequencing, de-duplication. The PDCP exchange PDUs having the data and signaling with the RLC over link 313. The RLC maps between the PDUs and MAC logical channels. RLC functions comprise ARQ, sequence numbering and resequencing, segmentation and resegmentation. The RLC exchanges the data and signaling with MAC 532.

In RRH DSP/CPU 520, MAC 532 maps between the MAC logical channels and MAC transport channels. MAC functions include buffer status, power headroom, channel quality, HARQ, user identification, random access, user scheduling, and QoS. MAC 532 exchanges the data and signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The PHY exchanges the data and signaling with PHYs in UEs 301-303 over the PHY transport channels.

In 5GNR RRH 311, antennas 511 receive wireless UL signals from UEs 301-303 and transfer corresponding electrical UL signals through duplexers 512 to LNA 515. LNA 515 boosts the UL signals for filter 514 which attenuates unwanted out-of-band energy. De-modulators 518 down-convert the UL signals from their carrier frequencies. D/A interfaces 519 convert the analog UL signals into digital UL signals for DSP/CPU 520. DSP/CPU 520 executes the network applications to recover and store UL data and signaling in BBU memory circuitry 523. In BBU processing circuitry 522, the BBU network applications process the recovered UL data and signaling from BBU memory circuitry 523. RRC 533 generates N2 signaling. RRC 533 and the SDAP forward the UL N1 signaling, N2 signaling, and N3 data from memory circuitry 523 to AMF 321 and UPF 322 over BBU circuitry 524-525.

BBU transceiver circuitry 525 receives Downlink (DL) N1 signaling, N2 signaling, and N3 data from AMF 321 and UPF 322. BBU transceiver circuitry 525 stores the DL data and signaling in BBU memory circuitry 523. The BBU network applications process the N3 data and N2 signaling from memory circuitry 523 to generate data and signaling. The BBU network applications forward the data and signaling to the RRH network applications in RRH 311 over RLC/PDCP link 313. In RRH 311, the network applications drive DSP/CPU 520 to transfer corresponding DL signals to D/A interface 519. D/A interface 519 converts the digital DL signals into analog DL signals for modulators 517. Modulators 517 up-convert the DL signals to their carrier frequencies. PA 516 amplifies the DL signals to a transmit power level. PA 516 transfers the amplified DL signals to filter 513 which attenuates unwanted out-of-band energy. Filter 513 transfers the DL signals through duplexers 512 to antennas 511. The electrical DL signals drive antennas 511 to emit corresponding wireless DL signals—including MU-MIMO signals—to 5GNR UEs 301-303.

In particular, the RRC exchanges handover signaling with UEs 301-303 and neighbor access point 320. The RRC receives UE measurements and handover signaling that indicate received signal strength and quality for access points 310 and 320 The PHY processes SRS to determine channel characteristics like Angle-of-Arrival and path loss for UEs 301-303. The RRC selects UEs for MU-MIMO groups based on their channel characteristics and handover proposals from neighbor access point 320. The MAC schedules the selected UEs in shared MU-MIMO resource blocks. The PHY beamforms downlink MU-MIMO signals to the selected UEs in the shared MU-MIMO resource blocks.

Figure 6:
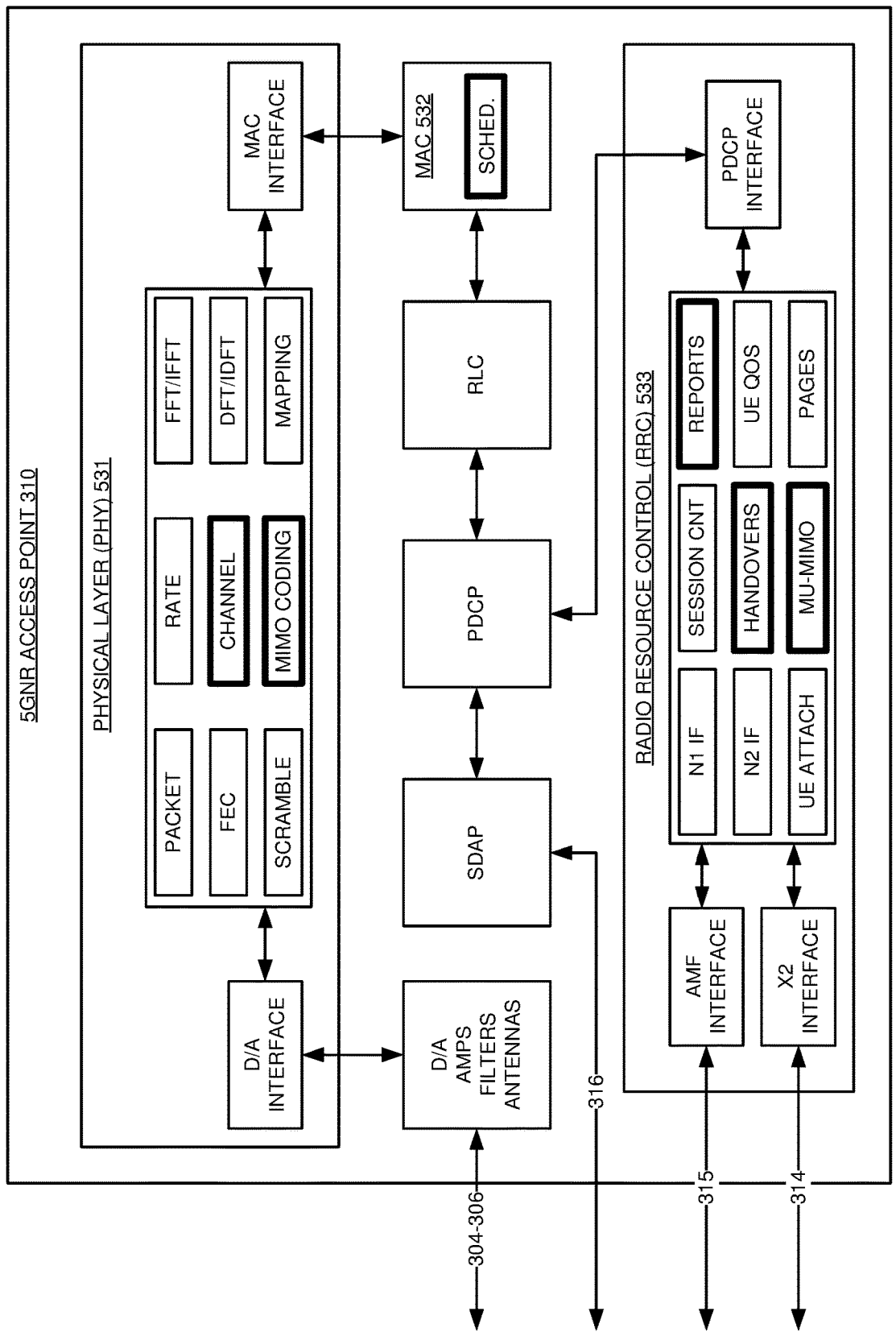
FIG. 6 illustrates the 5GNR access point that controls UE handovers from the neighbor access point to optimize MU-MIMO spectral efficiency.

FIG. 6 illustrates 5GNR access point 310 that controls UE handovers from neighbor access point 320 to optimize MU-MIMO spectral efficiency. In RRC 533, an AMF interface exchanges N2 signaling with AMF 321. An N2 interface consumes and generates the N2 signaling to handle RRC tasks. RRC 533 also has modules for N1 interface, UE attachment, session control (CNT), UE handovers, MU-MIMO, status reports, UE QoS, UE pages, and the like. The handover module processes X2 signaling to direct handovers—including processing handover proposals along with the MU-MIMO module to select UEs for hand-over into MU-MIMO groups. The status report module determines channel characteristics by processing measurement reports from UEs 301-303 and neighbor access point 320. The MU-MIMO module transfers MU-MIMO target information like group sizes and corresponding channel requirements to neighbor access point RRCs. The MU-MIMO module interacts with the handover module to allocate UEs 301-303 into MU-MIMO groups based on their AoA, received signal strength, and the like. The MU-MIMO module notifies MAC 532 of the selected MU-MIMO groups for MU-MIMO scheduling.

5GNR access point 310 has an SDAP that exchanges N3 data with UPF 322. The SDAP exchanges corresponding user data with the PDCP. RRC 533 has a PDCP interface that exchanges network signaling with the PDCP. The PDCP exchanges the user data and network signaling with the RLC, and the RLC exchanges the user data and network signaling with MAC 532. MAC 532 has several modules including a UE scheduling module. The UE scheduling module schedule UEs 301-303 in shared MU-MIMO resource blocks per the MU-MIMO groups determined by RRC 533. MAC 532 exchanges user data and network signaling with PHY 531.

PHY 531 has modules for packet formation/deformation, FEC encoding/decoding, rate matching/de-matching, scrambling/descrambling, channel estimation/equalization, FFTs/IFFTs, MIMO coding/decoding, layer mapping/de-mapping, DFTs/IDFTs, RE mapping/de-mapping, and the like. A channel processing module in PHY 531 determines channel characteristics by processing SRS and transfers the channel characteristics to RRC 533. A MIMO coding module individually beamforms 5GNR downlink signals for transmission to individual UEs in the MU-MIMO groups based on UE location. PHY 531 exchanges 5GNR signals that encode the user data and network signaling with radio circuitry that comprises D/A interfaces, amplifiers, filters, and antennas. The antennas exchange wireless signals that carry the user data and network signaling with UEs 301-303.

The wireless data network circuitry described above comprises computer hardware and software that form special-purpose MU-MIMO radios that control UE handovers to optimize MU-MIMO spectral efficiency. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose MU-MIMO radios that control UE handovers to optimize MU-MIMO spectral efficiency.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating Multi-User Multiple Input Multiple Output (MU-MIMO) radio circuitry to optimize MU-MIMO spectral efficiency, the method comprising:
networking circuitry transferring MU-MIMO target information to neighbor radio circuitry that processes the MU-MIMO target information to propose User Equipment (UEs) to handover from the neighbor radio circuitry to the MU-MIMO radio circuitry;
transceiver circuitry determining MU-MIMO channel characteristics for UEs;
the networking circuitry selecting ones of the UEs for handover based on their MU-MIMO channel characteristics and rejecting other ones of the UEs for handover based on their MU-MIMO channel characteristics; and
the transceiver circuitry wirelessly transferring handover rejection signals to the rejected UEs, wirelessly transferring handover acceptance signals to the selected UEs, and wirelessly transferring user data to the selected UEs using MU-MIMO.

2. The method of claim 1 wherein the transceiver circuitry determining the MU-MIMO channel characteristics for the UEs comprises the transceiver circuitry processing Sounding Reference Signals (SRS) from the UEs.

3. The method of claim 1 wherein the transceiver circuitry determining the MU-MIMO channel characteristics for the UEs comprises the transceiver circuitry determining Angle-of-Arrival (AoA) for the UEs.

4. The method of claim 1 wherein the transceiver circuitry determining the MU-MIMO channel characteristics for the UEs comprises the transceiver circuitry determining cross-correlation factors for the UEs.

5. The method of claim 1 wherein the transceiver circuitry determining the MU-MIMO channel characteristics for the UEs comprises the transceiver circuitry receiving attachment signaling from the UEs.

6. The method of claim 1 further comprising the networking circuitry receiving handover signaling from the neighbor radio circuitry indicating some of the MU-MIMO channel characteristics for the UEs.

7. The method of claim 1 wherein the networking circuitry transferring the MU-MIMO target information to the neighbor radio circuitry comprises the networking circuitry transferring signal measurement ranges to the neighbor radio circuitry.

8. The method of claim 1 wherein the networking circuitry transferring the MU-MIMO target information to the neighbor radio circuitry comprises the networking circuitry transferring MU-MIMO group sizes to the neighbor radio circuitry.

9. The method of claim 1 wherein the networking circuitry transferring the MU-MIMO target information to the neighbor radio circuitry comprises the networking circuitry transferring signal measurement ranges for MU-MIMO group sizes to the neighbor radio circuitry.

10. The method of claim 1 further comprising the networking circuitry determining MU-MIMO pairing rates for the selected UEs, re-selecting some of the selected UEs based on the MU-MIMO pairing rates, and transferring hand-over signaling to the neighbor radio circuitry to handover the re-selected ones of the selected UEs from the MU-MIMO radio circuitry to the neighbor radio circuitry.

11. Multi-User Multiple Input Multiple Output (MU-MIMO) radio circuitry to optimize MU-MIMO spectral efficiency, the MU-MIMO radio circuitry comprising:
networking circuitry configured to transfer MU-MIMO target information to neighbor radio circuitry that is configured to process the MU-MIMO target information to propose User Equipment (UEs) to handover from the neighbor radio circuitry to the MU-MIMO radio circuitry;
transceiver circuitry configured to determine MU-MIMO channel characteristics for UEs;
networking circuitry configured to select ones of the UEs for handover based on their MU-MIMO channel characteristics and reject other ones of the UEs for handover based on their MU-MIMO channel characteristics; and
the transceiver circuitry configured to wirelessly transfer handover rejection signals to the rejected UEs, wirelessly transfer handover acceptance signals to the selected UEs, and wirelessly transfer user data to the selected UEs using MU-MIMO.

12. The MU-MIMO radio circuitry of claim 11 wherein the transceiver circuitry is configured to process Sounding Reference Signals (SRS) from the UEs to determine the MU-MIMO channel characteristics.

13. The MU-MIMO radio circuitry of claim 11 wherein the transceiver circuitry is configured to determine Angle-of-Arrival (AoA) for the UEs to determine the MU-MIMO channel characteristics.

14. The MU-MIMO radio circuitry of claim 11 wherein the transceiver circuitry is configured to determine cross-correlation factors for the UEs to determine the MU-MIMO channel characteristics.

15. The MU-MIMO radio circuitry of claim 11 wherein the transceiver circuitry is configured to receive attachment signaling from the UEs to determine the MU-MIMO channel characteristics.

16. The MU-MIMO radio circuitry of claim 11 further comprising the networking circuitry configured to receive handover signaling from the neighbor radio circuitry that indicates some of the MU-MIMO channel characteristics for the UEs.

17. The MU-MIMO radio circuitry of claim 11 wherein the MU-MIMO target information comprises signal measurement ranges.

18. The MU-MIMO radio circuitry of claim 11 wherein the MU-MIMO target information comprises MU-MIMO group sizes.

19. The MU-MIMO radio circuitry of claim 11 wherein the MU-MIMO target information comprises signal measurement ranges for MU-MIMO group sizes.

20. The MU-MIMO radio circuitry of claim 11 further comprising the networking circuitry configured to determine MU-MIMO pairing rates for the selected UEs, re-select some of the selected UEs based on the MU-MIMO pairing rates, and transfer hand-over signaling to the neighbor radio circuitry to handover the re-selected ones of the selected UEs from the MU-MIMO radio circuitry to the neighbor radio circuitry.

\* \* \* \* \*